Figure 1:
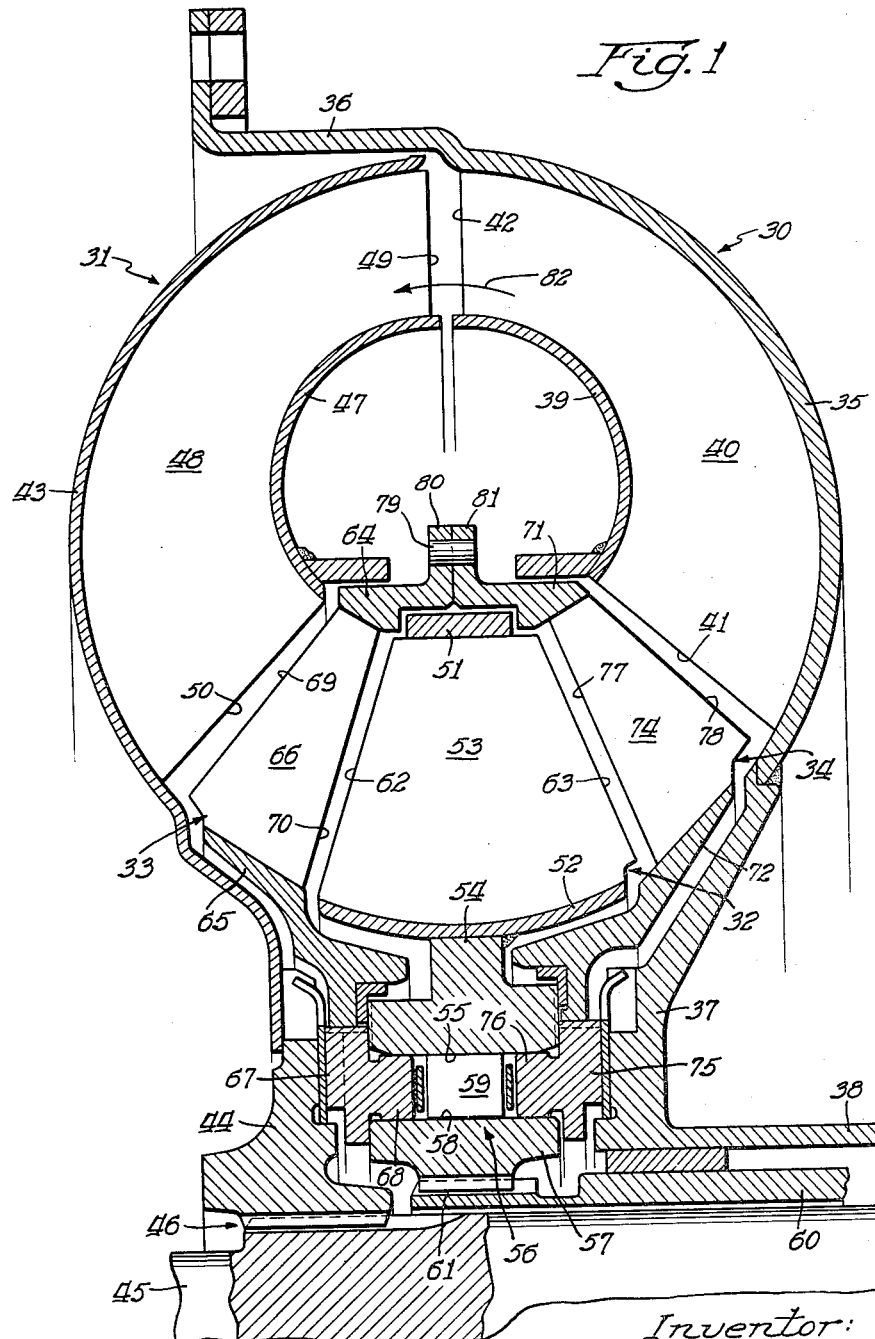

Inventor:
Anthony C. Mamo
By: Frank C. Parker
Atty.

Aug. 1, 1961   A. C. MAMO   2,994,197
HYDRODYNAMIC TORQUE TRANSMITTING DEVICE
Original Filed Aug. 22, 1955   4 Sheets-Sheet 2
Fig. 3
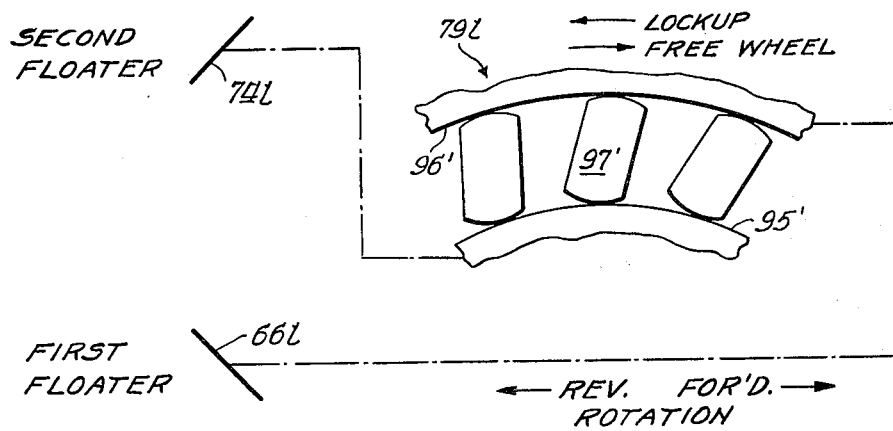
Fig. 4
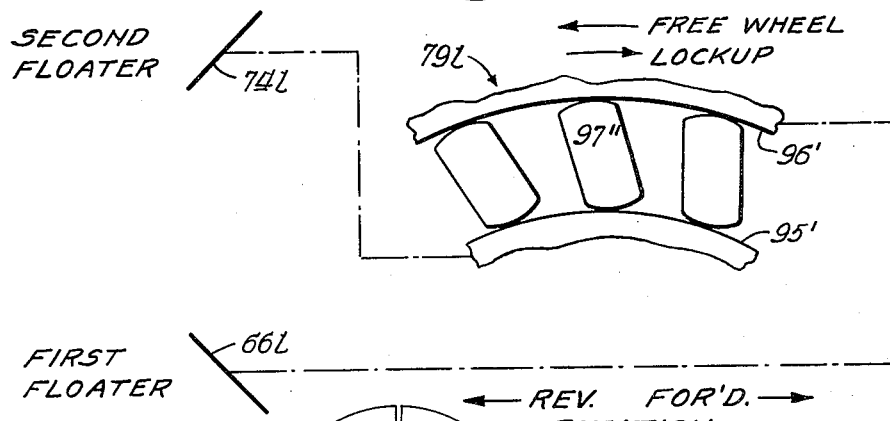
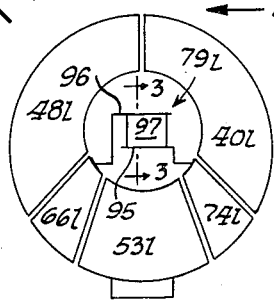
Fig. 2
Inventor:
Anthony C. Mamo
By: Frank C. Parker
Atty.

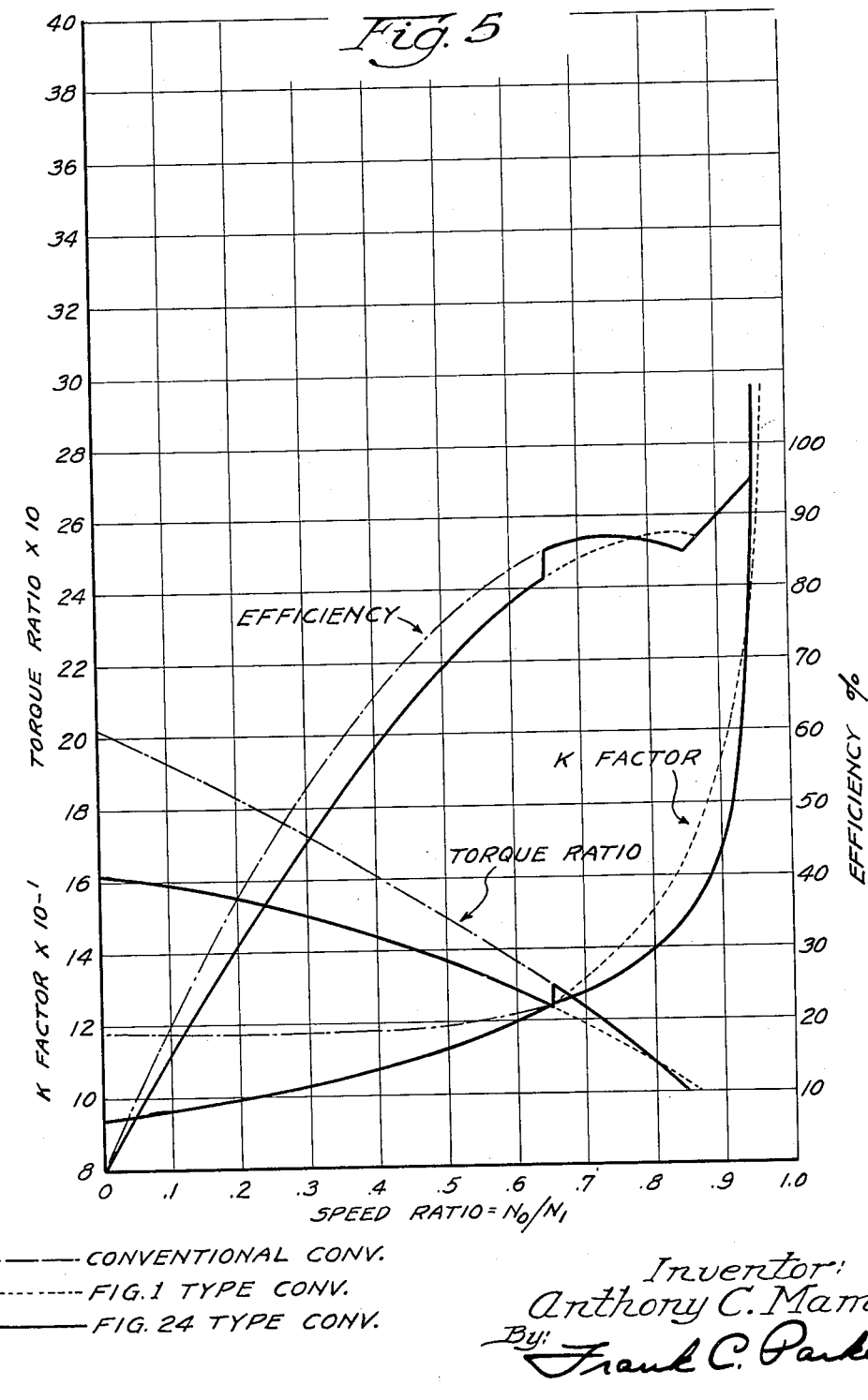

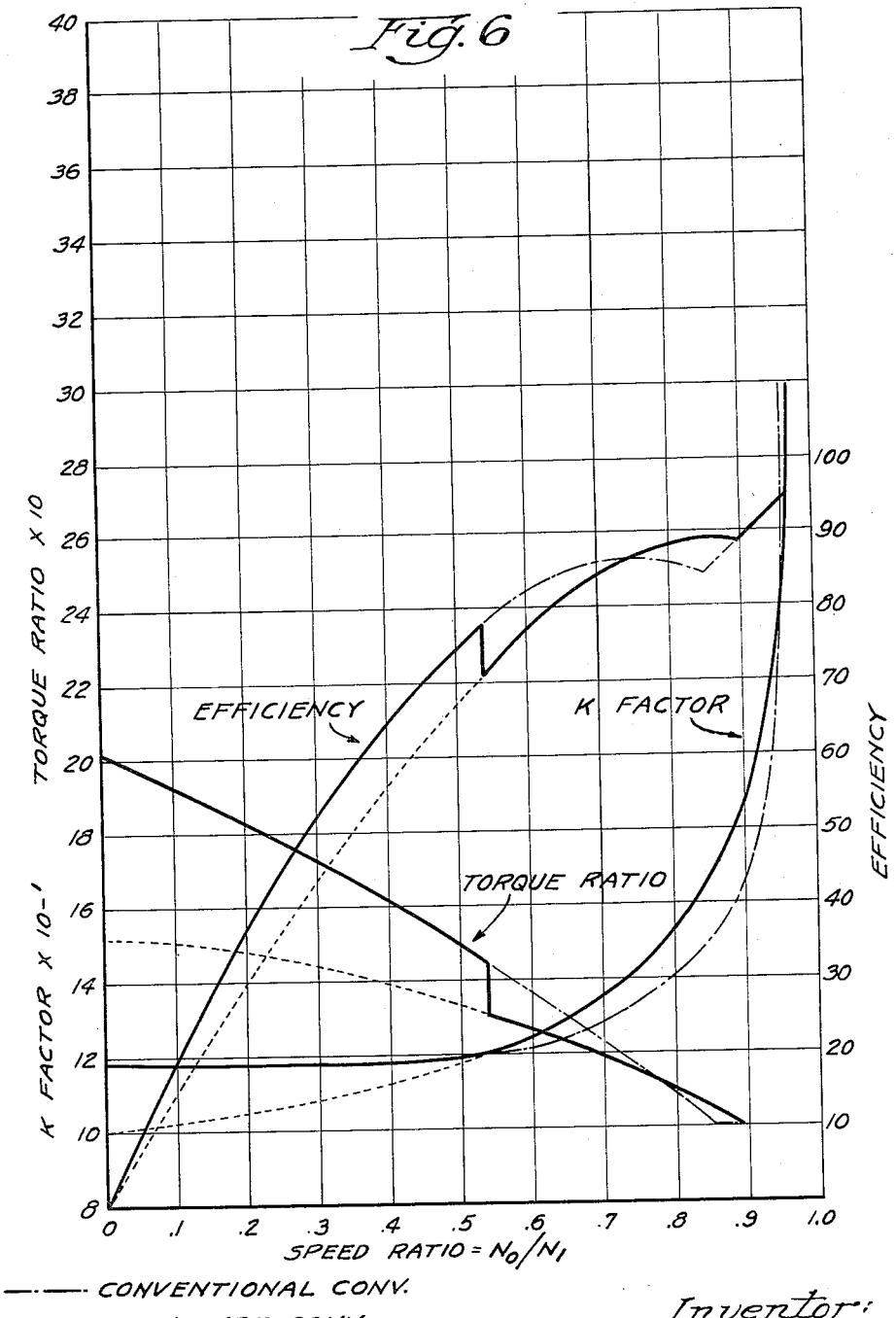

United States Patent Office 2,994,197
Patented Aug. 1, 1961

2,994,197
HYDRODYNAMIC TORQUE TRANSMITTING DEVICE
Anthony C. Mamo, Des Plaines, Ill., assignor to Borg-Warner Corporation, Chicago, Ill., a corporation of Illinois
Original application Aug. 22, 1955, Ser. No. 529,716, now Patent No. 2,954,672, dated Oct. 4, 1960. Divided and this application Jan. 20, 1959, Ser. No. 787,912
5 Claims. (Cl. 60—54)

The present invention relates in general to torque transmitting devices and more particularly to hydraulic torque converters of the type adapted to multiply and transmit torque to a load from a driving engine. The improved form of hydraulic torque converter disclosed herein is particularly suitable for use with a driving engine of the type ordinarily used in automotive vehicles.

This application is a division of my co-pending application, Serial No. 529,716, filed August 22, 1955, now U.S. patent No. 2,954,672, issued Oct. 4, 1960.

The principal object of the present invention is to provide an improved hydraulic torque converter of the type having a plurality of vaned elements which together define a substantially toroidal fluid circuit and wherein the elements include vaned impeller means adapted to be drivingly connected with a driving engine for circulating fluid through the toroidal circuit to impart kinetic energy thereto, vaned turbine means disposed in the path of the circulating fluid for absorbing the kinetic energy from the fluid as it leaves the impeller means, and vaned stator means effective to change the direction of flow of the fluid leaving the turbine means and prior to its return to the impeller means for enabling infinite variation of torque conversion by the converter over a range varying from maximum torque conversion to minimum torque conversion which occurs when the clutch point of the converter is reached and during which condition the converter transmits torque at a substantially one-to-one ratio between the impeller means and the driven or turbine means.

More particularly, the present invention provides a hydraulic torque converter which includes, in addition to the conventional vaned impeller, turbine and stator means, multiple floater elements drivingly interconnected with each other and freely rotatable with respect to the impeller, turbine and stator means, said floater elements being effective to absorb ginetic energy at one point in the toroidal fluid circuit and give up this absorbed kinetic energy to the fluid at a different point in the toroidal circuit so as to provide the multiple advantages which will be described hereafter in the present specification.

In the improved torque converters disclosed herein, the desirable operating characteristics mentioned heretofore are obtained by using the vaned floater elements for absorbing kinetic energy at one point in the toroidal fluid circuit and giving up this kinetic energy at another point in the toroidal fluid circuit. This has the effect of deflecting the fluid at the desired point in the toroidal fluid circuit and in the desired direction in order to change the normal operating characteristics of the converter and provide the advantages outlined above.

Accordingly, it is a more specific object of the present invention to provide a hydraulic torque converter comprising a plurality of relatively rotatable elements which together define a substantially toroidal fluid circuit and which comprise impeller means for imparting kinetic energy to the fluid and effecting circulation thereof to the toroidal circuit, turbine means for absorbing kinetic energy from the fluid, stator means for redirecting the fluid in a more forwardly direction after it leaves the turbine means so as to enable torque multiplication by the converter, and, a plurality of floater devices disposed in toroidally spaced relation with respect to the impeller, turbine and stator means for absorbing energy from the fluid circuit and giving up energy to the fluid circuit at different toroidally spaced points therein and thereby deflecting the fluid from the path which it would normally take to thus alter the operating characteristics of the converter.

In another broad aspect a primary object of the present invention is to provide infinite variation, between predetermined angular limits, in the direction of flow of the fluid entering one of the impeller, turbine or stator devices for thereby infinitely variably effecting the operation of the converter.

The present divisional application is directed to the use of the before mentioned new and improved floater devices in torque converters wherein a brake mechanism is employed between the floater elements whereby the floater elements are rendered effective to operate substantially as the embodiments disclosed in U.S. Patent No. 2,954,672 during a portion of the torque conversion range, while functioning as a conventional torque converter during another portion of the torque conversion range.

The foregoing and numerous other objects and advantages of the present invention will become apparent from the following detailed description, when read in conjunction with the accompanying drawings, wherein:

FIG. 1 is a sectional view through the upper half of one preferred form of hydraulic torque converter constructed in accordance with the principles of the present invention;

FIG. 2 is a schematic illustration of a torque converter of the general type disclosed herein wherein the vaned floater members are respectively disposed in toroidally spaced relation on opposite sides of the stator, and wherein the floater members are interconnected through the intermediary of a one-way clutch which permits the transmission of torque between the floater members when there is a tendency for one of the members to rotate in one relative direction of rotation with respect to the other and enables the floater members to free-wheel with respect to each other when there is a tendency for the one floater to rotate in the opposite relative direction of rotation with respect to the other;

FIG. 3 is a schematic fragmentary illustration taken along the line 24—24 in FIG. 2 and looking in the direction of the arrows and showing a one-way clutch suitable for use in the torque converter disclosed in FIG. 2 and so disposed that it will permit the floater elements to lock up whenever the first floater tends to rotate in a backward or counter-clockwise direction of rotation relative to the second floater or whenever the second floater tends to rotate in a forward or clockwise direction of rotation relative to the first floater;

FIG. 4 is a schematic fragmentary illustration similar to FIG. 3 and showing a one-way clutch adapted for use in the torque converter disclosed in FIG. 2 which permits the floater members to lock up and rotate in unison whenever the first floater tends to drive the second floater in a clockwise or forward direction of rotation or whenever the second floater tends to drive the first floater in a counterclockwise or backward direction of rotation;

FIG. 5 is a performance diagram of a hydraulic torque converter of the type shown in FIG. 2 wherein the one-way clutch interconnecting the floater members is disposed as shown in FIG. 3; and FIG. 6 is a performance diagram of a hydraulic torque converter of the type shown in FIG. 2 wherein the one-way clutch interconnecting the floater members is disposed as shown in FIG. 4.

With reference now to the drawings, wherein like reference numerals have been utilized in the different views to identify identical parts and wherein different letters have been added to the reference numerals to identify corresponding parts in modified forms of the invention, the embodiment illustrated in FIGS. 1–5 of U.S. Patent No. 2,954,672 will first be described.

With particular reference to FIG. 1, the hydraulic torque converter disclosed therein comprises, in general, an impeller 30, a turbine 31, a stator 32, a first floater member 33 and a second floater member 34.

The impeller 30 comprises an outer annular shell 35 having a forwardly projecting flange portion 36 adapted to be connected in any desired manner to a driving engine or motor, and the outer shell 35 is suitably secured, as by welding, to a generally radially outwardly extending flange 37 formed on the forward end of a rotatably mounted sleeve shaft 38. The impeller 30 also comprises an annular inner shell 39 which, together with the outer shell 35, rigidly supports a plurality of impeller vanes 40. Each of the impeller vanes 40 has an entrance 41 and an exit 42. As is clearly illustrated in FIGS. 2–5 of my U.S. Patent No. 2,954,672, each of the impeller vanes 40 slopes or slants slightly rearwardly or reversely from its entrance 41 to its exit 42.

The turbine 31 comprises an outer shell 43 which is rigidly secured to a hub 44 suitably splined on a shaft 45, as indicated generally at 46. The shaft 45 is mounted concentrically with respect to the sleeve shaft 38 so as to maintain concentric alignment between the impeller 30 and turbine 31. The turbine 31 also comprises an inner shell 47 which, together with the outer shell 43, supports a plurality of turbine vanes 48. Each of the turbine vanes 48 has an entrance 49 and an exit 50 and it will be noted that each of the turbine blades 48, when proceeding from the entrance 49 to the exit 50, is curved, sloping or slanting generally in a forward direction near the entrance 49 and slanting in a backwardly or reverse direction near the fluid exit 50. It will be understood that fluid leaving the impeller vanes 40 through the exits 42 thereof enters the turbine 31 through the entrances 49 of the turbine blades 48.

The stator 32 comprises a shell 51 and a shell 52 which together suitably support a plurality of stator vanes 53. The shell 52 of the stator 32 is suitably secured, as by welding to a member 54 having an inwardly facing cylindrical surface 55 which comprises the outer race of a one-way engaging device 56. The one-way engaging device 56 also comprises an inner member 57 having an outwardly facing cylindrical surface 58 which forms the inner race of the one-way engaging device 56. The races 55 and 58 are concentrically disposed with respect to each other and are adapted to have a plurality of peripherally spaced tiltable sprags or eccentric gripping devices 59 disposed therebetween. The sprags 59 tilt about their individual axes in one direction to a released condition and thus enable the races 55 and 58 to rotate relatively with respect to each other. When the spags 59 tilt in the opposite direction they are effective to lock up the two races. The inner member 57 is suitably splined to a sleeve shaft 60, as indicated at 61, with the shaft 60 being disposed concentrically between the shafts 45 and 38 and ordinarily secured to a stationary member. As a result, the stator 32 may rotate freely in a forward direction due to the action of the one-way engaging device 56 but whenever it tends to rotate reversely it is ordinarily held stationary.

Each of the stator vanes 53 has a fluid entrance 62 and a fluid exit 63 and the configuration of each of the stator blades 53 is as shown in FIGS. 2–5 of my U.S. Patent No. 2,954,672. It will be noted that each stator blade 53 is slanted slightly reversely adjacent its entrance 62 and is slanted considerably forwardly at the fluid exit 63 and throughout a major portion of the surface of the blade 53.

The first floater member 33 is provided with a pair of shells 64 and 65 within which a plurality of first floater blades or vanes 66 are rigidly mounted. The external shell 65 is rotatably mounted on an annular member 67 which is provided with an axially extending portion 68 respectively disposed between the inner race 58 and outer race 55 of the one-way clutch 56. The portion 68 of the annular member 67 serves to hold the concentricity of the first floater member 33 with respect to the impeller 30, turbine 31 and stator 32. Each of the first floater member vanes 66 has an entrance 69 and an exit 70 respectively disposed adjacent the exit 50 of the turbine blades 48 and the entrances 62 of the stator blades 53.

The second floater member 34 comprises a pair of shells 71 and 72 for mounting a plurality of second floater vanes 74. The shell 72 is rotatably mounted on an annular member 75 which is formed with an axially extending portion 76 disposed respectively between the outer race 55 and the inner race 58 of the one-way engaging device 56. The axially extending portion 76 maintains the concentricity of the second floater member 34 with respect to the other vaned elements 30, 31, 32 and 33 of the torque converter. Each of the vanes 74 of the second floater member 34 is provided with an entrance 77 and an exit 78.

The floater members 33 and 34, in the embodiment of the invention disclosed in FIG. 1 are rigidly connected together by means of suitable pins 79 which extend through flanged portions 80 and 81 respectively formed on the shell 64 of the first floater member 33 and the shell 71 of the second floater member 34.

The stator 32, comprising the plurality of peripherally spaced vanes 53 is held against reverse rotation by the one-way engaging device 56 and thus the fluid entering the stator 32 impinges against the forward faces of the stator vanes 53 and leaves the stator in substantially the same direction as the slope of the stator blades at their exit 63. It will be borne in mind that the fluid entering the stator vanes and impinging against the forward faces thereof, tends to drive the stator vanes 53 in a reverse direction. Since the stator 32 is held stationary it acts as a reaction member and enables the hydraulic torque converter to multiply torque between the impeller vanes 40 and the turbine vanes 48.

One of the principal advantages, of the many enumerated in my U.S. Patent No. 2,954,672, of the torque converter disclosed in FIG. 1 over a conventional torque converter not provided with the floating members 33 and 34 arises from the increased capacity of the torque converter disclosed herein to handle torque without substantially structurally modifying the impeller, turbine or stator in any way.

From the various embodiments of the invention disclosed heretofore it is apparent that the angular disposition of the floater member vanes may be variable over a wide range of angles. More particularly, the invention contemplates that the limiting factor in determining the range of angular disposition of the floating member vanes, as well as the vanes of the impeller, turbine and stator, will arise from the choking effect on the fluid flowing through the vanes and encountered when a plurality of peripherally arranged vanes or blades are disposed at sharply acute angles with reference either to the direction of rotation of the vanes or to a direction 180 degrees from the direction of rotation of the vanes. In other words, the present invention contemplates that the angular disposition of the first floater vanes may be anywhere between a direction very near to the direction of rotation of the vanes and a direction 180 degrees from the direction of rotation of the vanes. The present invention further contemplates that the second floater vanes may be angularly disposed in a similar manner.

In the embodiment of the invention disclosed in FIG. 2, the vaned elements are like those in FIG. 1. The interconnecting means 79l comprises a one-way engaging device having an inner race 95 integrally connected with the second floater vanes 741 and an outer race 96 rigidly interconnected with the first floater vanes 661. A plurality of tiltable sprags or wedging elements 97 are operably disposed between the races 95 and 96 and are adapted to lock up the vaned members 661 and 741 upon any tendency thereof to rotate relatively in one direction and to release and enable free relative rotation between the vaned members 661 and 741 upon any tendency thereof to rotate relatively in the opposite direction.

In FIG. 3 the sprags 97' are disposed between the races 95' and 96' so that when the first floater vanes 661 tend to be driven in a backward direction the one-way clutch 791 locks up and enables the transmission of torque from the first floater vanes 661 to the second floating member vanes 741. As soon as the first floater member tends to be driven in a forward direction of rotation the one-way clutch 791 free-wheels and allows the floaters to rotate freely relative to each other.

In the embodiment of the invention disclosed in FIG. 3, therefore, the advantages attributable to the form of the torque converter shown in FIG. 1 are obtained during the relatively low speed ratio range and the torque converter functions as a conventional converter in the higher speed ratio range near the clutch point.

During the low speed ratio of the torque converter, the one-way clutch 791 locks up and the converter functions like the FIG. 1 type converter at this time. At the high speed ratio end of the torque conversion range the one-way clutch 791 overruns or free-wheels and the converter then functions like a conventional converter without the floating element therein.

FIG. 5 shows the performance curves of a conventional converter in dot-dash lines and that of the FIG. 1 type converter in dotted lines. The solid lines shown in FIG. 5 represent the performance curves for a torque converter of the type shown in FIG. 2, with the one-way clutch disposed as shown in FIG. 3. As is apparent, the one-way clutch is locked-up at stall and remains locked-up until the turbine to impeller speed ratio increases to approximately .65. At this speed ratio the fluid flow from the turbine vanes 481 is such as will tend to drive the first floater vanes 661 forwardly. The one-way clutch 791 therefore free wheels above the speed ratio of approximately .65. Thus this torque converter functions like the FIG. 1 type converter at speed ratios up to .65 and like a conventional converter without the floating members at speed ratios above .65.

It will be understood that the point where the one-way clutch 791 changes from a locked-up condition to free-wheeling is primarily dependent upon the angular disposition of the floater vanes 661 and 741 and this point can be changed by changing the floater vane angles. For example, if the first floater vanes 661 are directed more rearwardly than the vanes 66 in FIG. 1, then the change from a locked-up to a free-wheeling condition of the one-way clutch 791 would occur at a lower speed ratio than .65.

In the embodiment of the invention shown in FIG. 4, the sprags 97" lock up when the first floater vanes 661 tend to rotate forwardly relative to the second floater vanes 741. This condition normally prevails at the upper or higher speed ratio end of the torque conversion range so that the desirable advantages attributable to the torque converter disclosed in FIG. 1 are obtained at the upper end of the torque conversion range without sacrificing torque ratio at the lower end of the torque conversion range.

FIG. 6 shows the performance curves of the FIG. 2 type of hydraulic torque converter having the one-way clutch 791 arranged as shown in FIG. 4. In FIG. 6, the performance curves of a conventional converter are represented by the dot dashed lines and the dash lines represent the performance curves of the FIG. 1 type converter. The solid lines represent the performance curves of the FIG. 2 type converter having the one-way clutch 791 disposed as shown in FIG. 4. Accordingly, this type of converter functions substantially like a conventional torque converter from stall up to a turbine to impeller speed ratio of approximately .54 and like the FIG. 1 type converter at higher speed ratios. The one-way clutch 791 thus overruns at the lower speed ratios and locks up at the higher speed ratios.

The embodiment disposed herein is one of a plurality of different forms of the FIG. 1 type converter disclosed in my U.S. Patent No. 2,954,672. It is to be understood that this embodiment is not intended to be exhaustive, to any degree whatsoever, of the possible forms in which the present invention may be applied. Rather, the numerous embodiments disclosed in my said U.S. patent are intended primarily to be indicative of the wide scope encompassed by the present invention. It is therefore contemplated that numerous and extensive additional modifications of the present invention may be made without departing from the spirit or scope thereof.

What is claimed is:

1. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising toroidally spaced vaned floater means freely rotatable about said axis with respect to said driving, driven and reaction means; said toroidally spaced vaned floater means having a one-way driving connection therebetween for enabling free relative rotation therebetween in the one direction and preventing relative rotation therebetween in the opposite direction and being thereby effective to transfer kinetic energy in one direction between different points in said toroidal circuit.

2. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising a pair of floater means toroidally disposed on opposite sides of said vaned reaction means and freely rotatable about said axis with respect to said driving, driven and reaction means; said toroidally disposed vaned floater means having a one-way driving connection therebetween for enabling free relative rotation therebetween in one direction and preventing relative rotation therebetween in the opposite direction and being thereby effective to transfer kinetic energy in one direction between different points in said toroidal circuit.

3. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising a pair of toroidally spaced vaned floater means freely rotatable about said axis with respect to said driving, driven and reaction means; a first one of said floater means being disposed between said vaned driven and reaction means and the second one of said floater means being disposed between said vaned reaction and driving means; said toroidally spaced vaned floater means having a one-way driving connection therebetween for enabling said first floater means to drive said second floater means in a forward direction but permitting said second floater means to overrun said first floater means in a forward direction, whereby the spaced floater means are effective to transfer kinetic energy in one direction between different points in said toroidal circuit.

4. A hydraulic torque converter having a plurality of vaned elements together defining a substantially toroidal fluid circuit; all of said elements being rotatable about a common axis; said elements comprising vaned driving means for circulating the fluid through said toroidal circuit and thereby imparting kinetic energy to the fluid, vaned driven means for absorbing kinetic energy from the fluid, and vaned reaction means effective to change the direction of flow of the fluid for enabling the conversion of torque by said converter; and said elements further comprising a pair of toroidally spaced vaned floater means freely rotatable about said axis with respect to said driving, driven and reaction means; a first one of said floater means being disposed between said vaned driven and reaction means and the second one of said floater means being disposed between said vaned reaction and driving means; said toroidally spaced vaned floater means having a one-way driving connection therebetween for enabling said second floater means to drive said first floater means in a forward direction but permitting said first floater means to overrun said second floater means in a forward direction, whereby the spaced floater means are effective to transfer kinetic energy in one direction between different points in said toroidal circuit.

5. A hydraulic torque converter having a plurality of elements together defining a substantially toroidal fluid circuit; all of said elements being rotatable about a common axis; said elements comprising impeller means having vanes for circulating the fluid through said toroidal circuit and thereby imparting kinetic energy to the fluid, turbine means having vanes disposed in the path of the circulating fluid for absorbing kinetic energy from the fluid leaving the impeller vanes, and stator means having vanes effective to change the direction of flow of the fluid leaving the turbine means and prior to its return to said impeller means for enabling infinitely variable conversion of torque by said converter; and said elements further including a pair of toroidally spaced floater members having at least one of said impeller, turbine and stator means disposed therebetween; one-way engaging means inter-connecting said floater members for enabling the transfer of torque between said floater members when the floater members tend to rotate relatively in one direction of rotation and for permitting said floater members to free wheel when they tend to rotate relatively in the opposite direction of rotation; said floater members being freely rotatable about said axis with respect to said impeller, turbine and stator means; the flow of the fluid respectively leaving said impeller, turbine and stator vanes being infinitely variable in accordance with variations in said torque conversion between a first set of flow values corresponding to maximum torque conversion by the converter and a second set of flow values corresponding to substantially no torque conversion by the converter; each of said floater members respectively having vanes disposed in the path of the circulating fluid; whereby, for a first predetermined range of said flow values, one of said floater members is effective to absorb kinetic energy from the fluid which is transmitted as torque applied in one direction of rotation to the other floater member which gives up this absorbed kinetic energy to the fluid and, for a second predetermined range of said flow values, the floater members free wheel with respect to each other.

References Cited in the file of this patent

UNITED STATES PATENTS

| | | |
|---|---|---|
| 2,196,585 | Gette | Apr. 9, 1940 |
| 2,762,197 | Ullery | Sept. 11, 1956 |